United States Patent
Hamulski et al.

(10) Patent No.: US 7,449,240 B2
(45) Date of Patent: Nov. 11, 2008

(54) MONOAXIALLY ELASTIC LAMINATE FILM

(75) Inventors: Markus Hamulski, Gronau-Epe (DE); Andreas Hagemann, Dülmen (DE); Matthias Perick, Ahaus-Alstätte (DE)

(73) Assignee: Nordenia Deutschland Gronau, GmbH, Gronau (DE)

( * ) Notice: Subject to any disclaimer, the term of this patent is extended or adjusted under 35 U.S.C. 154(b) by 921 days.

(21) Appl. No.: 10/306,801

(22) Filed: Nov. 27, 2002

(65) Prior Publication Data

US 2003/0134126 A1    Jul. 17, 2003

(30) Foreign Application Priority Data

Nov. 28, 2001 (DE) ................. 101 58 345

(51) Int. Cl.
*B32B 27/00* (2006.01)
*B32B 27/32* (2006.01)
*B32B 27/40* (2006.01)

(52) U.S. Cl. ............ 428/411; 428/423.1; 428/424.8; 428/516; 428/523

(58) Field of Classification Search .......... 428/423.1, 428/424.2, 424.4, 424.8, 474.4, 476.3, 476.9, 428/477.7, 411, 516, 523

See application file for complete search history.

(56) References Cited

U.S. PATENT DOCUMENTS

| | | |
|---|---|---|
| 4,681,580 A | 7/1987 | Reising et al. |
| 4,834,820 A | 5/1989 | Kondo et al. |
| 5,344,691 A | 9/1994 | Hanschen et al. |
| 5,376,430 A | 12/1994 | Swenson et al. |
| 5,422,178 A | 6/1995 | Swenson et al. |
| 5,501,679 A | 3/1996 | Krueger et al. |
| 5,683,787 A | 11/1997 | Boich et al. |
| 5,691,043 A | 11/1997 | Keller et al. |
| 6,312,786 B1 | 11/2001 | Schwinn |

FOREIGN PATENT DOCUMENTS

| | | |
|---|---|---|
| DE | 195 26 044 | 1/1997 |
| EP | 0 703 068 | 3/1996 |
| EP | 0 674 581 | 6/1996 |
| EP | 0 521 883 | 8/1996 |

OTHER PUBLICATIONS

H. Vavra (1935) "Grundlehre de Schneiderei [Principles of Tailoring]", Verlag Otto Beyer, Leipzig, p. 47.

*Primary Examiner*—Thao T. Tran
(74) *Attorney, Agent, or Firm*—Collard & Roe, P.C.

(57) ABSTRACT

A monoaxially elastic laminate film is provided with a core layer made of a thermoplastic elastomer and at least one skin layer co-extruded together with the core layer. The skin layer is made of a thermoplastic plastic with a molecular lattice that becomes brittle when it solidifies, so that the plastic stretches only slightly when a stretching force is applied, and breaks without any transition when a pre-determined tear force has been exceeded. After becoming brittle, the molecular lattice is irreversibly broken up by monoaxial stretching in the stretching direction, but is maintained perpendicular to the stretching direction, and thereby reinforces the film in the crosswise direction.

3 Claims, 3 Drawing Sheets

MONOAXIALLY ELASTIC LAMINATE FILM

CROSS REFERENCE TO RELATED APPLICATIONS

Applicants claim priority under 35 U.S.C. §119 of German Application No. 101 58 345.1-16 filed Nov. 28, 2001.

BACKGROUND OF THE INVENTION

1. Field of the Invention

The present invention relates to a monoaxially elastic laminate film that can stretch elastically in a preferred stretching direction, and possesses a relatively fixed and non-elastic structure perpendicular to this stretching direction.

2. The Prior Art

Monoaxially elastic laminates are used, for example, for disposable hygiene products such as diapers and incontinence pads, for example in the elastic waistbands of these articles. See U.S. Pat. No. 4,681,580. For such uses, material in strips is required, which can stretch by two to several times its original length in the lengthwise direction, and which demonstrate a high level of shape stability in the direction perpendicular to it. The material is supposed to act as much as possible like conventional elastics, which are produced, in terms of textile technology, as knitted structures with latex braids knitted into them. Such elastics are described, for example, in H. Vavra, Grundlehre der Schneiderei [Principles of Tailoring], Verlag Otto Beyer, Leipzig, 1935, page 47.

A laminate film is known from DE 197 15 938 A1, which has a core layer made of a thermoplastic elastomer, and skin layers made of a brittle material. The elastic core is made sticky with tackifiers, for example. The skin layers, which are preferably applied to the core layer on both sides, consist of a thermoplastic plastic that becomes brittle when cured, and inorganic fillers to promote the brittleness of the material. With these measures, the laminate film is connected with a nonwoven fabric. The strips to be connected are passed to a pair of rollers and are exposed to pressure stress in the roller nip. Because of the pressure stress, the skin layer breaks down into fibers, and the nonwoven fabric is connected with the exposed sticky surface of the core layer. Neither the laminate film nor the laminate consisting of the laminate film and the nonwoven fabric demonstrate the properties of a conventional elastic that are required for the use described initially.

A fluffy laminate film is described in DE 195 26 044 A1, which has a core layer made of a thermoplastic elastomer and at least one skin layer co-extruded together with the core layer, made of a thermoplastic, stretchable plastic base substance, and additive particles heterogeneously bonded into it. After having been extruded, the laminate film is stretched in one or more axes, whereby the additive particles come loose from the plastic base substance that surrounds them, at their border regions, and they stand up to form a fluffy surface when the stretched laminate film relaxes. This film also does not demonstrate the properties of an elastic that possesses a high degree of elasticity in a preferred stretching direction and is stable in shape in the direction perpendicular to that.

SUMMARY OF THE INVENTION

The object of the invention is to provide a monoaxially elastic laminate film that demonstrates a high degree of elasticity in only one axial direction, and possesses a relatively fixed and non-elastic structure in the direction perpendicular to it, similar to a conventional elastic.

In accordance with the invention, a monoaxially elastic laminate film is provided with a core layer made of a thermoplastic elastomer and at least one skin layer co-extruded together with the core layer whereby the skin layer is made of a thermoplastic plastic with a molecule lattice or matrix that becomes brittle when it solidifies, so that the plastic stretches only slightly when a stretching force is applied, and breaks without any transition when a predetermined tear force has been exceeded, and whereby the molecule lattice that becomes brittle when it solidifies is irreversibly broken up, i.e. changed by monoaxial stretching in the stretching direction, but is maintained perpendicular to the stretching direction, and thereby reinforces the film in the crosswise direction.

The skin layer of the laminate film according to the invention demonstrates a brittle breaking behavior, which is comparable to the breaking behavior of duromers. Until a specific tear strength is applied, the material possesses a high level of resistance to stretching. Under tensile stress, the material does not stretch, or stretches only slightly, and then tears abruptly, without any transition, if the pre-determined tear force is exceeded. The brittle breaking behavior can be produced by the mixture composition of the skin layer or by a subsequent treatment of the co-extrudate. The subsequent treatment includes physical and mechanical treatments. For example, a heat treatment below the glass transition temperature of a partially crystalline thermoplastic causes the plastic to become brittle. Furthermore, the mechanical properties can be changed by means of stretching. In this connection, there is frequently a relationship between the mechanical properties and the molecular orientation, which in turn is determined by the stretching conditions (temperature, velocity, degree of stretching). In the orientation direction, the strength of the stretched material generally increases greatly, while its stretchability decreases.

According to the invention, the laminate is stretched monoaxially, below the stretching limit of the core layer, but at a tensile force above the tear strength $F_R$ of the skin layer. As a result, the molecular lattice of the skin layer, which has become brittle, is irreversibly broken up in the stretching direction, and is maintained perpendicular to the stretching direction. This results in a material that can be stretched by two or several times its original length in the preferred stretching direction, and demonstrates a relatively fixed and non-elastic structure in the direction perpendicular to it. According to a preferred embodiment of the invention, the skin layer can be stretched by at least 50% in the preferred stretching direction at a tensile force that is needed to stretch the core layer by 100%, while stretching in the crosswise direction is less than 5% when the same force is applied.

The laminate according to the invention has a core layer which is preferably single-layer, but optionally may also be a multi-layer structure. In either case, the core layer essentially imparts elasticity to the laminate. The core layer is covered with a skin layer that exhibits the properties described above, over its entire surface, on one or on both of its sides. The skin layer may also be broken up merely in certain regions, rather than over its entire surface, as a result of being stretched in the stretching direction, and consequently the material demonstrates a high level of elasticity in an axis direction only in certain regions. Elastic regions and non-elastic regions can be optically differentiated.

Block copolymers, preferably styrene isoprene styrene (SIS) block copolymers, styrene butadiene styrene (SBS) block copolymers, styrene ethylene block copolymer (SEBS), or polyether block amides (PEBA) can be used for the core layer. Polymers that do not shrink when subjected to heat are particularly advantageous. Elastomer polyurethanes, ethylene copolymers, e.g. ethylene vinyl acetates, ethylene/propylene copolymer elastomers, or ethylene/propylene/diene terpolymer elastomers can also be used for the core layer. It should be understood that mixtures of the stated elastomers with one another, or with modifying non-elastomers, can be used. The core layer may also be mixed with tackifiers, in order to increase the capacity of the elastomer core layer to adhere to the skin layer. The tackifiers include aliphatic or aromatic hydrocarbon tackifiers, polyterpene resin tackifiers, and hydrogenated tackifying resins. Aliphatic hydrocarbon resins are preferred.

Polyolefins made brittle by subsequent treatment are suitable for the skin layer. Furthermore, mixtures of polyolefins and polystyrene, mixtures of polyolefins, polystyrene, and ethylene vinyl acetate, and mixtures of ethylene butyl acrylate and polystyrene can be used. The skin layer can also contain additives. These include, among other things, antistatic agents, pigments, fillers, anti-adhesion agents, heat stabilizers, light stabilizers, and the like.

The skin layer and the core layer touch over their entire surface after co-extrusion, and are connected with one another at least adhesively. In addition, adhesion-promoting layers can be provided between the skin layer and the core layer.

A method for the production of a monoaxially elastic laminate film that has a core layer made of a thermoplastic elastomer and at least one skin layer made of a polyolefin plastic is also provided. According to the invention, in order to form a brittle molecular structure in the skin layer, the co-extrudate is stretched at a temperature of 140° C. to 155° C. in a first stretching direction, monoaxially, in a ratio of 1:5 to 1:10, and subsequently cooled to room temperature while shrinking. By means of renewed stretching perpendicular to the first stretching direction, in a ratio between 1:2.5 and 1:3.5, the molecule lattice in the skin structure is broken up, so that the laminate can be stretched in the stretching direction perpendicular to the first stretching direction, and remains stiff in the first stretching direction. Preferably, a three-layer co-extrudate is produced, which has a skin layer on both sides of the core layer. According to a preferred embodiment of the invention, the skin layers are made of a polypropylene homopolymer.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
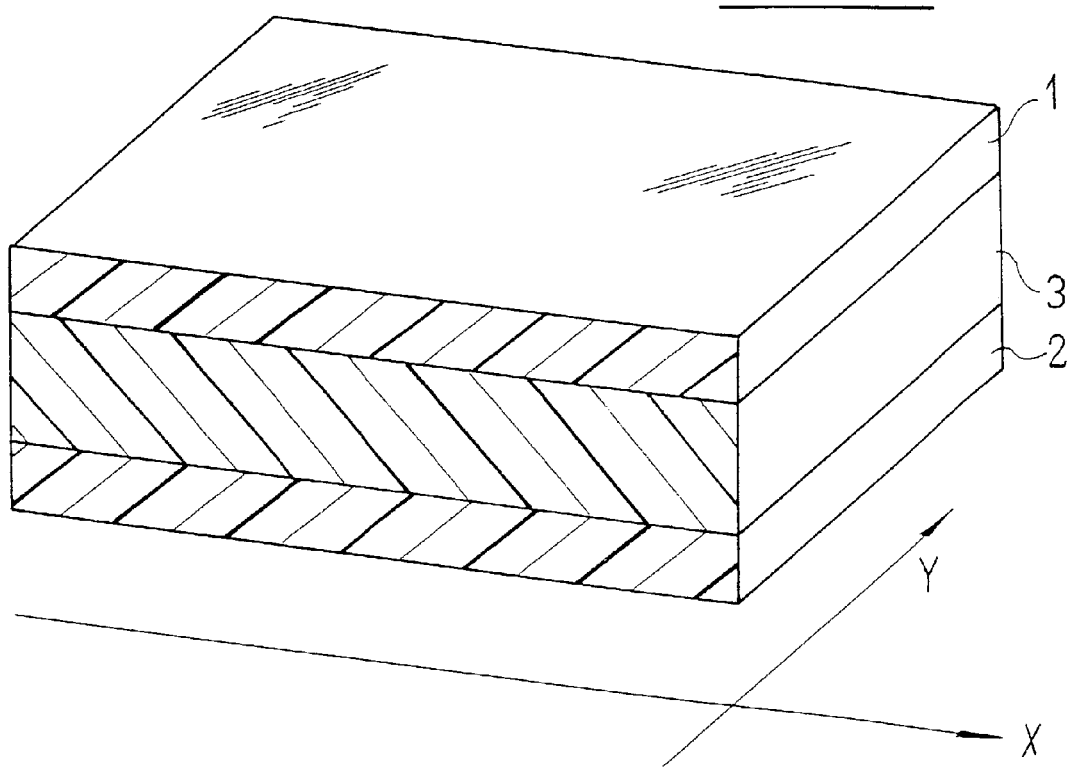
FIG. 1 shows the layer structure of a monoaxially elastic laminate film according to an embodiment of the invention.

Referring now to the drawings, FIG. 1 shows a section from a monoaxially elastic laminate film produced according to the invention, shown on a greatly enlarged scale. The film has a core layer 3 made of a thermoplastic elastomer, and skin layers 1, 2 arranged on both sides of it and co-extruded together with core layer 3. Skin layers 1, 2 are made of a thermoplastic plastic with a molecule lattice that has become brittle when solidified, which is formed during extrusion and/or by means of subsequent treatment. Skin layers 1, 2 demonstrate a stretching behavior that is similar to a duroplastic. When a stretching force F is applied, the material does not stretch or stretches only slightly, as long as a pre-determined tear force $F_R$ is not exceeded. If the tear force is exceeded, the material tears without any transition. If the laminate film shown in FIG. 1 is stretched in the direction X with a force F, the elastic core layer will easily follow this stretching force, and when the force is eliminated, it will essentially return to the previous configuration. If the specific tear strength $F_R$ of the skin layers is exceeded during stretching, characteristic cracks and gaps form in skin layers 1, 2, which are similar to glacier crevices, on a microscopic scale. In these regions, the molecule structure, i.e. the brittle molecule lattice, is irreversibly broken up or changed, so that when stretching occurs again, low forces are sufficient to break the molecule structure up once again. In the direction perpendicular to the preferred stretching direction (coordinate Y), in contrast, the brittle molecule lattice is maintained, so that the laminate film keeps a relatively fixed and non-elastic structure in the Y direction.

Figure 2:
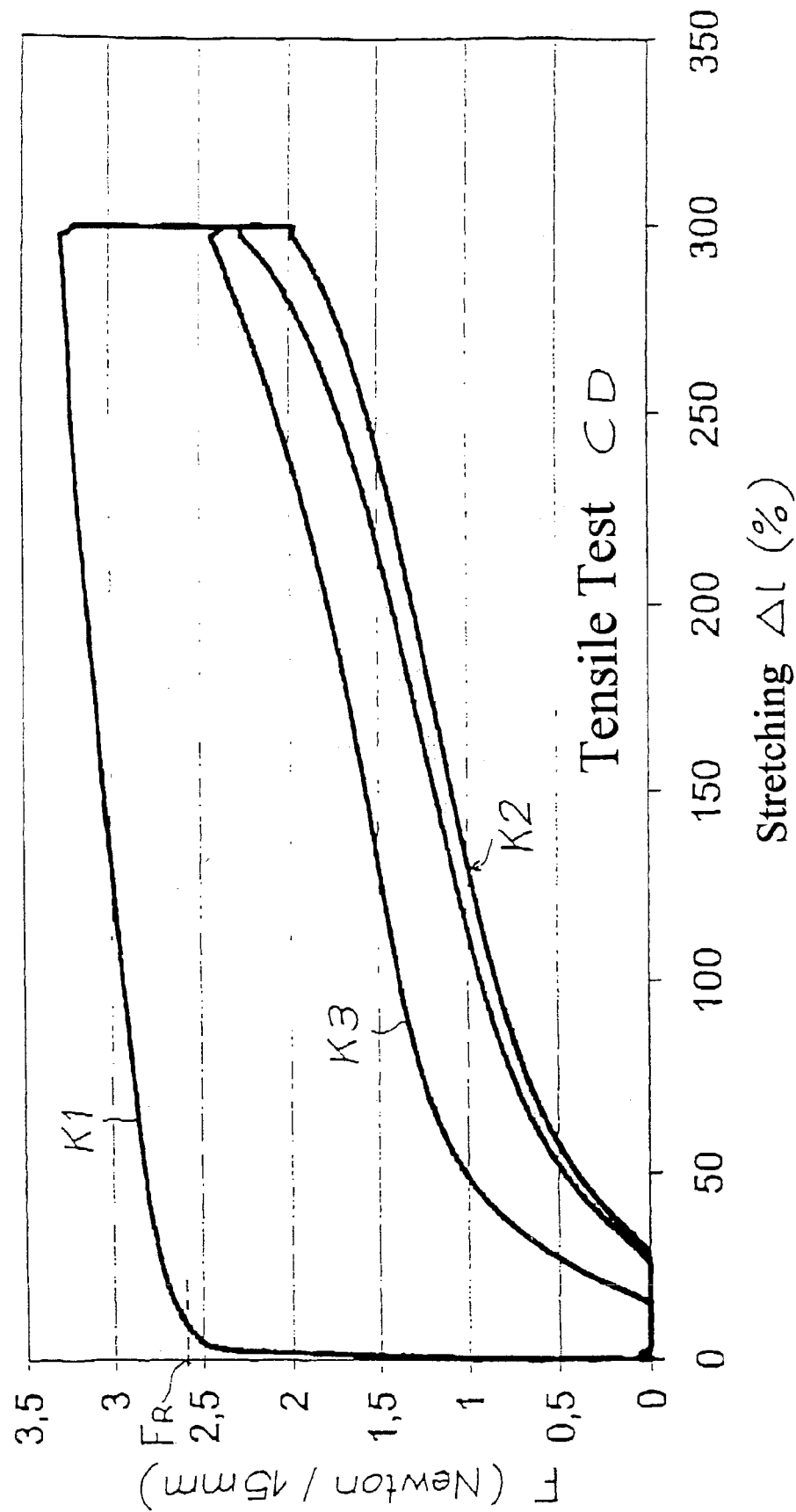
FIG. 2 is a force/stretching diagram for the stretching behavior of the laminate film according to the invention, in the preferred stretching direction.

FIG. 2 shows the described behavior of the laminate film for the X direction, in a force/length change diagram. The tensile force F is defined on the ordinate, as a force in newtons (N) that acts on a strip with a width of 15 mm. The abscissa shows the stretching $\Delta l$ in %. When the strip is stretched for the first time, a high level of tensile force is required in order to bring about a slight change in length $\Delta l$ (curve K1). As soon as the tensile force exceeds the tear strength $F_R$ defined by the brittle molecule lattice of the skin layers, the molecule lattice tears and a characteristic curve progression is observed, at which a slight force F causes severe further stretching. If the tensile force F is eliminated after the tear strength FR has been exceeded, the film essentially returns to its original configuration. The return to this position takes place in accordance with the stress relief curve K2. If stretching occurs again, the curve progression according to curve K3 occurs. In the preferred stretching direction, in other words, in the direction X, the elasticity of the laminate film is essentially determined by the elasticity behavior of core layer 3. The material can be stretched by a multiple of its original length. After the first stretching, the laminate film behaves like a typical elastomer in the X direction, and it continues to behave that way after the second and any subsequent stretching.

Figure 3:
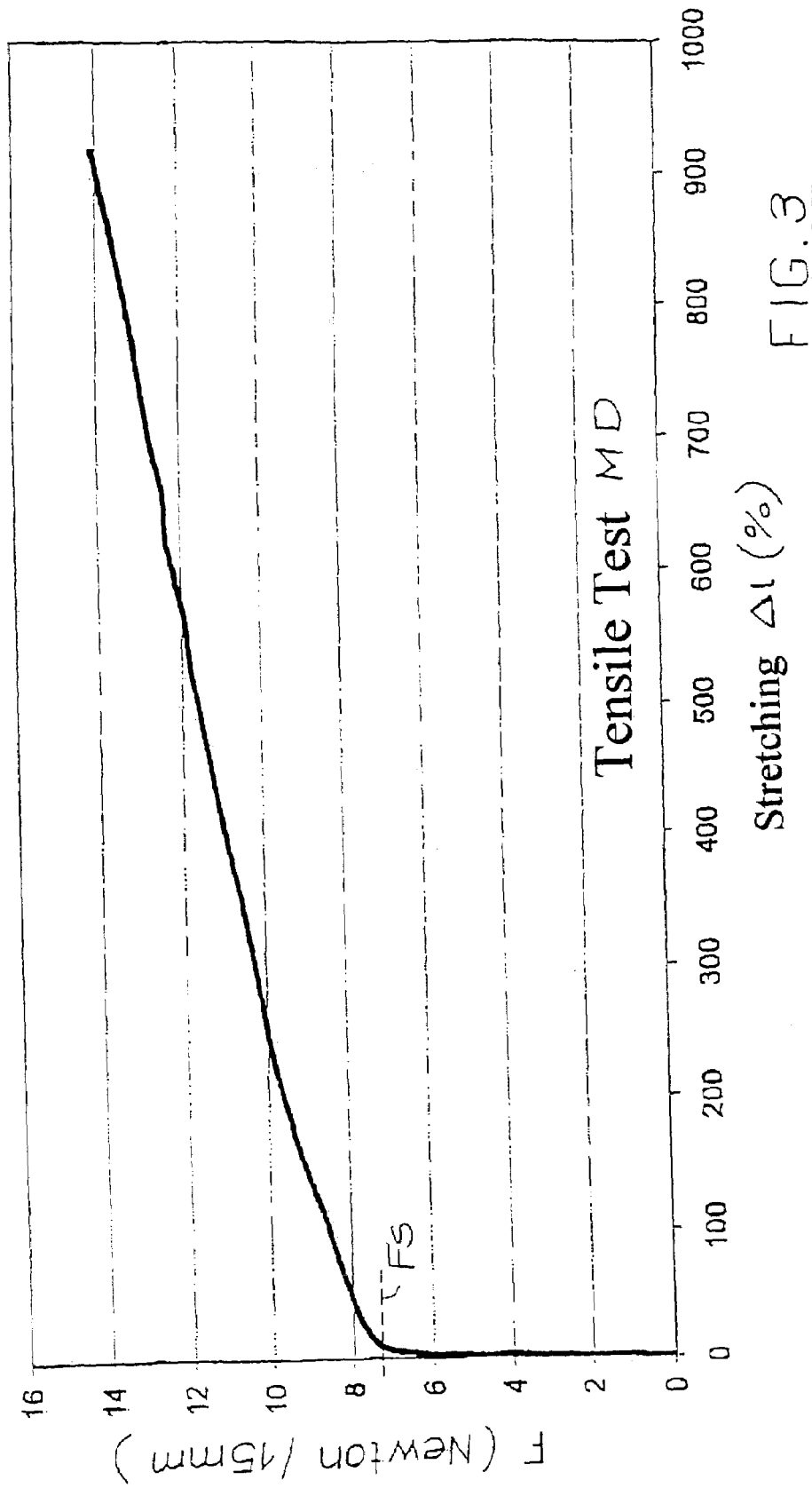
FIG. 3 is a force/stretching diagram for the stretching behavior of the laminate film perpendicular to the preferred stretching direction.

FIG. 3 shows the force/stretching behavior in the Y direction, in other words perpendicular to the preferred stretching direction X. In the exemplary embodiment, the Y direction corresponds to the machine running direction MD. Up to a threshold value $F_S$, practically no stretching occurs in the Y direction. This threshold value $F_S$ can be adjusted within limits that are known to a person skilled in the art of plastics. A comparison of FIGS. 2 and 3 shows that the laminate film according to the invention can be stretched by a multiple of its original length in the X direction, while it is stable in shape in the Y direction and essentially absorbs forces that act in the Y direction without stretching, up to a threshold value $F_S$.

A person skilled in the art has various possibilities available for structuring the skin layers so as to form within the skin layers a molecule lattice that has become brittle when solidified, which can be irreversibly broken up in the stretching direction by exceeding the tear force $F_R$, and at the same time is maintained perpendicular to the stretching direction. Skin layers having the following properties after a first stretching are preferred. At a tensile force that is needed in order to stretch the elastomer core layer by 100%, they stretch in one direction by at least 50%, in the other direction by preferably less than 5%, at the same force.

EXAMPLE 1

A three-layer laminate film with the following structure was co-extruded on a three-layer co-extrusion system. The skin layers each were made of polypropylene homopolymer with a density of 0.900 g/cm$^3$ and a melt index of 2 g/10 min at 230° C. and 2.16 kg. The layers were adjusted to a thickness of 24 μm.

The core layer was made of a styrene block copolymer that was capable of extrusion, namely a styrene isoprene styrene triblock with a styrene proportion of 18 wt.-% and a melt index of 7 g/10 min at 200° C. and 5 kg. The thickness of the elastomer core layer was 400 μm. After the film was formed and cooled, it was monoaxially stretched in a roller stretching machine at a temperature of 148° C., in the machine running direction, in a ratio of 1:7, and subsequently cooled in a tempering machine, whereby it shrank by 20% of the extrusion length. In the third process step, the monoaxially oriented film was stretched in a ratio of 1:3, perpendicular to the machine running direction, at room temperature, and subsequently relaxed again.

The laminate film produced in this way possessed a thickness of 80 μm. It was strong and stable in shape in the machine running direction, and possessed a high degree of elasticity perpendicular to the machine running direction. In a tensile test, stretching of less than 3% was measured in the machine running direction, at a force of 5 N. In the crosswise direction, the material stretched by 120% at the same force.

EXAMPLE 2

A film that contained a mixture of polypropylene and 30 wt.-% talcum in its two outside skin layers was extruded on a three-layer film blowing system. The grain size of the talcum was below 0.5 μm. The thickness of the outside layers was 5 μm, in each instance. The core layer of the film was made of a mixture of a styrene block copolymer (SIS triblock with a styrene proportion of 18 wt.-%) and ethylene vinyl acetate with 18 wt.-%, so that a melt index of 2 g/10 min at 190° C., 2.16 kg resulted. The thickness of the core layer was 60 μm.

In a second production step, the film that was produced was cold-stretched in the crosswise direction at a temperature of 15° C., specifically at a stretching ratio of 1:5. After relaxation, a material was present that behaved in very stable manner in the machine running direction, and demonstrated a high degree of elasticity in the direction perpendicular to it. During a test with a tensile test machine, stretching of 185% was achieved in the crosswise direction, at 3 N/50 mm. At the same force in the machine running direction, the film stretched by only about 3%.

EXAMPLE 3

A multi-layer film with the following structure was co-extruded on a three-layer co-extrusion system. The core layer was made of a thermoplastic polyurethane with a Shore hardness according to DIN 53505 of 70 Shore A. The skin layers each were made of a mixture of HDPE (high-density polyethylene) with equal portions of polystyrene and ethyl vinyl acetate. The HDPE demonstrated a density of 0.960 g/cm$^3$ and a melt index of 8 g/10 min at 190° C., 2.16 kg. The polystyrene was a homopolymer with a melt flow rate of 18 g/10 min at 200° C. and 5 kg. The ethyl vinyl acetate contained 25% vinyl acetate and had a melt index of 3 g/10 min at 190° C. and 2.16 kg. The total thickness of the layers was 100 μm, the ratio of the layers being 1:8:1. The film produced was very stable in the machine running direction. In the crosswise direction, it was easily stretched by hand. Afterwards, it behaved in elastic manner in the crosswise direction.

EXAMPLE 4

A film that was composed of three layers was extruded. The core of the film was made of a polyethylene block amide (PEBA), the outside layers of a mixture (blend) of HDPE, onto which 5 wt.-% maleic acid anhydride had been grafted, and of 20 wt.-% polystyrene with an additive of 0.5 wt.-% talcum. Polyether block amides are known under the trade name of PEBAX (ELF ATOFINA), among others. HDPE grafted with maleic acid anhydride was produced by the DuPont company. The talcum had an average grain size of 5 μm. The total thickness of the film was 50 μm, the outside layers having a thickness of 5 μm each and the core having a thickness of 40 μm.

EXAMPLE 5

A laminate film having the same thickness distribution as in Example 4 was co-extruded. A polyester elastomer from the DSM company (trade name Arnitel) was used for the core of the film. The outside layers were composed of a blend of ethyl butyl acrylate (60 wt.-%), polystyrene (39.5 wt.-%), and talcum (0.5 wt.-%). The total thickness of the film was 70 μm; the outside layers were each 6 μm thick. The ethyl butyl acrylate had a molecular proportion of 28% butyl acrylate and a melt index of 4 g/10 min at 190° C. and 2.16 kg. The polystyrene and talcum had the same characteristics as in Example 4.

EXAMPLE 6

A film with a thickness of 35 μm was extruded on a three-layer film blowing system. The core of the film was 30 μm thick and was made of a copolymer of ethylene and octene, produced using metallocene catalysts. The density of the copolymer was 0.870 g/cm$^3$. A melt index of 1 g/10 min was measured at 190° C. and 2.16 kg. The outside layers of the film consisted of a blend of 75 wt.-% polypropylene, 0.8 wt.% talcum, and 24.2 wt.-% polystyrene. The polypropylene was a homopolymer with a density of 0.910 g/cm$^3$ and a melt index of 8 g/10 min at 230° C. and 2.16 kg.

EXAMPLE 7

A film with a thickness of 80 μm was extruded on a flat film system. A blend of styrene butadiene styrene block copolymer (SBS) and styrene isoprene styrene block copolymer (SIS) was used for the core of the film. The melt index of the film was 6 g/10 min at 200° C. and 5 kg. A blend of HDPE, polystyrene, and 20 wt.-% ethyl vinyl acetate was used for the outside layers. The outside layers were each 6 μm thick, the core was 68 μm thick. The material produced was very stable in the machine running direction and could only be stretched at a force of more than 6 N/15 mm. In the crosswise direction, the film could already be stretched at a force of 3.3 N/15 mm, by 300%. After the first stretching, only a force of 2.5 N/15 mm was necessary to achieve the same stretching of 300%.

EXAMPLE 8

A film produced according to Example 7 was stretched in a stretching frame, by 300%, in the crosswise direction, and subsequently relieved of stress. The result was a film that was very elastic in the crosswise direction and continued to stretch very little in the machine direction. When using the same force that resulted in stretching by 300% in the crosswise direction, stretching of only about 5% was determined in the machine direction.

While only a few embodiments of the present invention have been shown and described, it is to be understood that many changes and modifications may be made thereunto without departing from the spirit and scope of the invention as defined in the appended claims.

What is claimed is:

1. A monoaxially elastic laminate film comprising a core layer made of a thermoplastic elastomer and at least one skin layer co-extruded together with said core layer,
   wherein said at least one skin layer comprises a thermoplastic plastic with a molecular lattice that becomes brittle when said lattice solidifies, said plastic stretching only slightly when a stretching force is applied and breaks without any transition when a predetermined tear force has been exceeded;
   wherein said molecular lattice that becomes brittle when said lattice solidifies is irreversibly broken up by monoaxial stretching in the stretching direction, but is maintained perpendicular to the stretching direction, and thereby reinforces the film in the crosswise direction,
   so that said skin layer can be stretched by at least 50% in a preferred stretching direction at a tensile force that is needed to stretch the core layer by 100%, while stretching in the crosswise direction is by less than 5% when the same force is applied;
   wherein said skin layer is broken up only in certain regions, as a result of being stretched in the stretching direction; and
   wherein said skin layer contains inorganic filler additives.

2. The laminate film according to claim 1, wherein said core layer is made of a block copolymer selected from the group consisting of styrene isoprene styrene (SIS), styrene butadiene styrene (SBS), styrene ethylene block copolymer (SEBS), and polyether block amides (PEBA) block copolymers, or of a thermoplastic polyurethane, or of a polymer of ethylene and octene produced using metallocene catalysts.

3. The laminate film according to claim 1, wherein said skin layer comprises a polyolefin made brittle by subsequent treatment, or a mixture of polyolefin and polystyrene, or a mixture of polyolefin, polystyrene, and ethyl vinyl acetate, or a mixture of ethyl butyl acrylate and polystyrene.

* * * * *